United States Patent
Sessions

(10) Patent No.: US 6,397,062 B1
(45) Date of Patent: May 28, 2002

(54) MULTIPLE ANTENNA TEST SYSTEM AND METHOD TO SIMULTANEOUSLY EVALUATE MULTIPLE ELEVATIONS OF POTENTIAL WIRELESS BASE STATION SITES

(75) Inventor: Drew Sessions, Del Ray Beach, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/821,865

(22) Filed: Mar. 30, 2001

(51) Int. Cl.[7] ............................................. H04B 17/00
(52) U.S. Cl. ...................... 455/423; 455/67.4; 455/101
(58) Field of Search ................................ 455/423, 424, 455/425, 67.1, 67.4, 67.6, 115, 129, 101, 561, 562, 277.1, 277.2; 375/347

(56) References Cited

U.S. PATENT DOCUMENTS 5,507,035 A * 4/1996 Bantz et al. ................. 455/101
5,574,989 A * 11/1996 Watson et al. ............... 455/101

OTHER PUBLICATIONS

Neil J. Boucher, The Cellular Radio Handbook: A Reference for Cellular System Operation, Third Edition, 1995, Quantum Publishing, Inc., Mill Valley, CA.
Paul Bedell, Cellular/PCS Management, 1999, pp. 24–27, McGraw–Hill, New York, NY.

* cited by examiner

Primary Examiner—Thanh Cong Le
(74) Attorney, Agent, or Firm—Kilpatrick Stockton LLP

(57) ABSTRACT

A multiple antenna test system and method to simultaneously evaluate field strengths of wireless transmission paths at multiple elevations of potential base station sites. Multiple test antennas are securely attached to an elevating device, such as a crane or cherry picker. Each test antenna is positioned at a substantially similar elevation as a proposed siting for a wireless communications antenna. Then, a transmitter(s) produces test propagation signals that are selectively broadcast from each of the test antennas. Each test antenna transmits on a unique channel in order to differentiate the elevation of each antenna. Using this invention, multiple elevations of a potential site are completed in one survey. Therefore, this invention provides significantly quicker testing than conventional methods, and allows wireless service providers to rapidly, inexpensively, and efficiently locate wireless communications equipment.

43 Claims, 3 Drawing Sheets

MULTIPLE ANTENNA TEST SYSTEM AND METHOD TO SIMULTANEOUSLY EVALUATE MULTIPLE ELEVATIONS OF POTENTIAL WIRELESS BASE STATION SITES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of wireless communications. More particularly, this invention makes use of and includes multiple antennas attached to an elevating device, such as a crane or cherry picker, and is useful for simultaneously evaluating wireless field strengths at multiple elevations and for locating potential base station sites.

2. Description of the Related Art

Wireless communication has experienced explosive growth. In just a few years cellular telephone usage has soared, and more growth is planned as wireless Internet access improves. This explosive growth has revolutionized data and voice communication.

This explosive growth, however, presents a challenge for wireless service providers. As cellular communication soars in use, more cellular base stations are required. These base stations house equipment for transmitting, receiving, and processing wireless communications to a communications network. Each base station covers a geographic sector, or "cell," and each cell varies in size depending upon the terrain and the number of users. As use of wireless services grows, more cells are needed and, hence, more base stations are required.

Choosing the location for a new base station, however, is extremely complicated. The location of the base station largely determines the quality and range of the cell's signal coverage. The location of the base station is important because radio waves propagate according to natural laws and not city boundaries. See NEIL J. BOUCHER, *THE CELLULAR RADIO HANDBOOK* 42 (1995). The tall buildings of urban areas, for example, can both confine radio waves and also cause reflections. See id. at 44. Thus the final location of a base station is often a process of evaluating many potential sites and choosing the location that offers the best compromise of many considerations. See PAUL BEDELL, *CELLULAR/PCS MANAGEMENT* 24–27 (1999).

Often these potential base station sites are located atop urban buildings or radio towers. Engineers must somehow evaluate the quality and range of a base station signal transmitted from atop a selection of potential buildings or towers. As most cellular designers recognize, the most reliable field strength measurements are obtained when signals are broadcast from the actual site itself (e.g., the roof of the desired building). The field strength could be estimated using mathematical formulae, but these formulae require several correction factors. See BOUCHER, supra, at 59. An actual transmission from or near the potential site, called a "survey," is therefore necessary to accurately evaluate cellular transmission and reception.

A method of evaluating the communication paths of an elevated antenna uses a crane or cherry-picker. The conventional method involves bringing a large crane or cherry-picker to the potential base station site, and hoisting a boom with an attached antenna to a selected elevation. A transmission is made from the antenna at that elevation, and the field strength of the transmission is measured at various points within the potential cell. Measuring the field strength of the transmission at various points is often referred to as "driving" a test. Typically, it takes several hours to set up for a test and three hours to drive a test. When all the measurements at a selected elevation are complete, the boom repositions the antenna to next elevation and begins to drive a new transmission to evaluate the field strength at that elevation. For example, an antenna is positioned at 100 feet to drive a first test and then is repositioned at 150 feet to drive a second test.

Cranes and cherry-pickers are very expensive to operate. Because this heavy equipment must often be rented from an independent operator, the rental charges cost hundreds of dollars per hour. Cranes and cherry-pickers, in fact, have been said to unnecessarily double the cost of any survey. See BOUCHER, supra, at 87. Typically, there are multiple elevations to test the field strengths of the transmission paths. Because cranes and cherry-pickers are cumbersome and because of the time involved in setting up and driving a test, only a few elevations, at most, can be evaluated in a work day. One location, in fact, may require two or more work days before moving to the next location. This cumbersome conventional method makes the cell site survey very inefficient.

There is, accordingly, a need for a method and system to simultaneously test multiple transmission paths at different selected elevations in order to accurately measure field strengths at each selected elevation. Further, the method and system must be very easy to install and implement, promote efficient field strength testing, and be cost effective.

BRIEF SUMMARY OF THE INVENTION

The aforementioned problems are minimized by using multiple antennas selectively attached to an elevating device, such as a crane or cherry picker, for testing and locating wireless communications equipment. This invention allows wireless service providers to simultaneously evaluate the field strengths of wireless transmission paths at multiple elevations of potential base station sites. The multiple antenna test system and method make use of a transmitter(s) that is powered by a generator. The transmitter(s) produces test propagation signals that are then selectively broadcast from each of the test antennas. Each test antenna transmits on a unique channel in order to differentiate the elevation of each antenna. For example, an antenna at 150 feet might transmit at 500 MHz, a second antenna at 125 feet might transmit at 666 MHz, and a third antenna at 100 feet might transmit at 717 MHz. Using this invention, multiple elevations of a potential site are typically driven in one survey.

Each test antenna is securely attached to the elevating device at a substantially similar elevation as a proposed siting for a wireless communications antenna. Those skilled in the art will recognize various methods and systems of attaching each test antenna of the elevating device. For example, each antenna could be affixed and mounted on selected locations of the actual boom of a crane. The boom itself would then be raised and/or lowered to fine tune the elevations of the antennas. Alternatively, each antenna could be housed in a protective carrier that is secured to the boom of a crane by one or more connected cables. The cable(s)

would connect the protective carrier to a hoisting system. Once the boom has been extended to its maximum height, the hoisting system(s) would fine tune the elevation of each antenna.

The multiple antenna test broadcasts various test propagation signals associated with each antenna. Network interface equipment may be used to process the multiple sets of test propagation signals transmitted from each of the antennas to the multiple receiving locations within the potential cell. The test propagation signals may include the Industrial, Scientific, and Medical (ISM) Band frequencies, such as, 2.4–2.5 GHz, cellular telephone frequencies, such as, 806–960 MHz, 1710–1855 MHz, and 2500–2690 MHz, paging frequencies, digital processing frequencies, and any other frequency in the electromagnetic spectrum. In addition, the type of antenna used to transmit the test signals may be directional or omni-directional.

The multiple antenna test is significantly less expensive than the conventional method. Because the multiple antenna test simultaneously evaluates multiple elevations of a potential site, the costly rental expenses of conventional method are decreased by 50% or more when there are multiple elevations to test at a potential site. In addition, the multiple antenna test also yields more efficient testing. Again, because the multiple antenna test evaluates multiple elevations of a potential site, cellular designers can conduct more tests in a work day. In general, the multiple antenna test can reduce manpower costs by 50% or more when there are multiple elevations to test at a potential site. The multiple antenna test thus promotes more efficient testing, and the total time to complete a survey is substantially reduced.

BRIEF DESCRIPTION OF THE DRAWINGS

These and other features, aspects, and advantages of the multiple antenna test system and method are better understood when the following Detailed Description of the Invention is read with reference to the accompanying drawings, wherein.

DETAILED DESCRIPTION OF THE INVENTION

The multiple antenna test system and method of this invention allows wireless service providers to simultaneously evaluate field strengths of wireless transmission paths at multiple elevations of potential base station sites. Multiple test antennas are securely attached to an elevations device, such as a crane or cherry picker. Each test antenna is positioned at a substantially similar elevation as a proposed siting for a wireless communications antenna. Then, a transmitter(s) produces test propagation signals that are selectively broadcast from each of the test antennas. Each test antenna transmits on a unique channel in order to differentiate the elevation of each antenna. For example, an antenna at 150 feet might transmit at 550 MHz, a second antenna at 125 feet might transmit at 666 MHz, and a third antenna at 100 feet might transmit at 717 MHz. Using this invention, multiple elevations of a potential site are typically driven in one survey. Therefore, this invention provides significantly quicker testing than conventional methods, and allows wireless service providers to rapidly, inexpensively, and efficiently locate wireless communications equipment.

Figure 1:
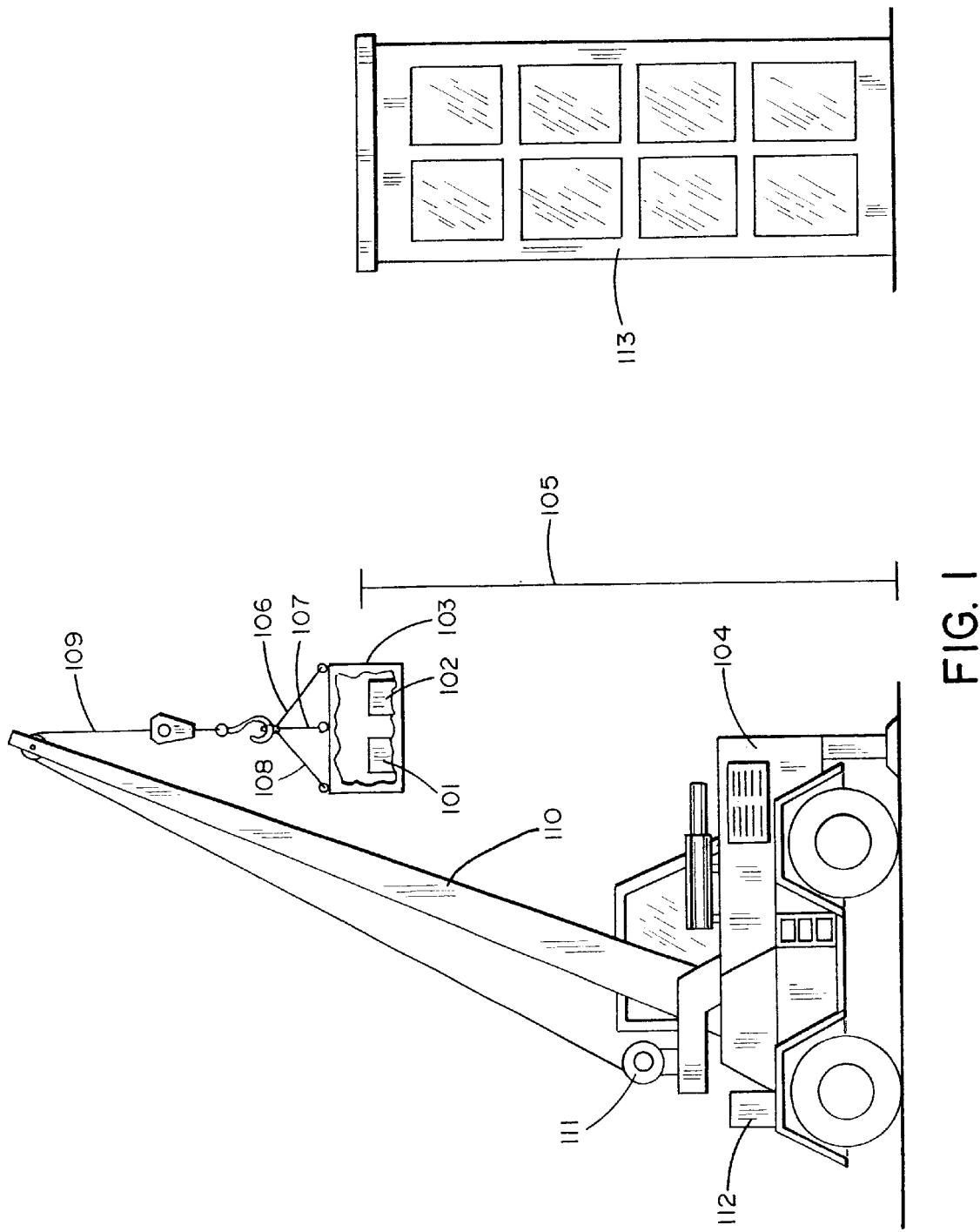
FIG. 1 is a schematic drawing of a conventional test that makes use of an antenna attached to a crane to test field strengths at a single elevation of a potential site.

FIG. 1 depicts a conventional test that includes and makes use of a single transmitter 101 and antenna 102 that are housed in a protective carrier 103 and attached to a crane 104 to test field strengths of communication signals at a single elevation 105 of a potential site. The protective carrier 103 is supported by cables 106–108 that are connected to a lead cable 109 that extends the length of the boom 110 to a hoisting system 111. Further, a generator 112 provides power supply to the transmitter 101 and antenna 102. The protective carrier 103 is positioned at a substantially similar elevation 105 near a potential base station site, such as a building 113. The antenna 102 simulates a potential wireless communications antenna positioned atop the building 113. The transmitter 101 produces propagation test signals. The antenna 102 transmits the propagation test signals. The transmitted propagation test signals are then received at various locations within the cell and the propagated radio field strengths are measured.

Figure 2:
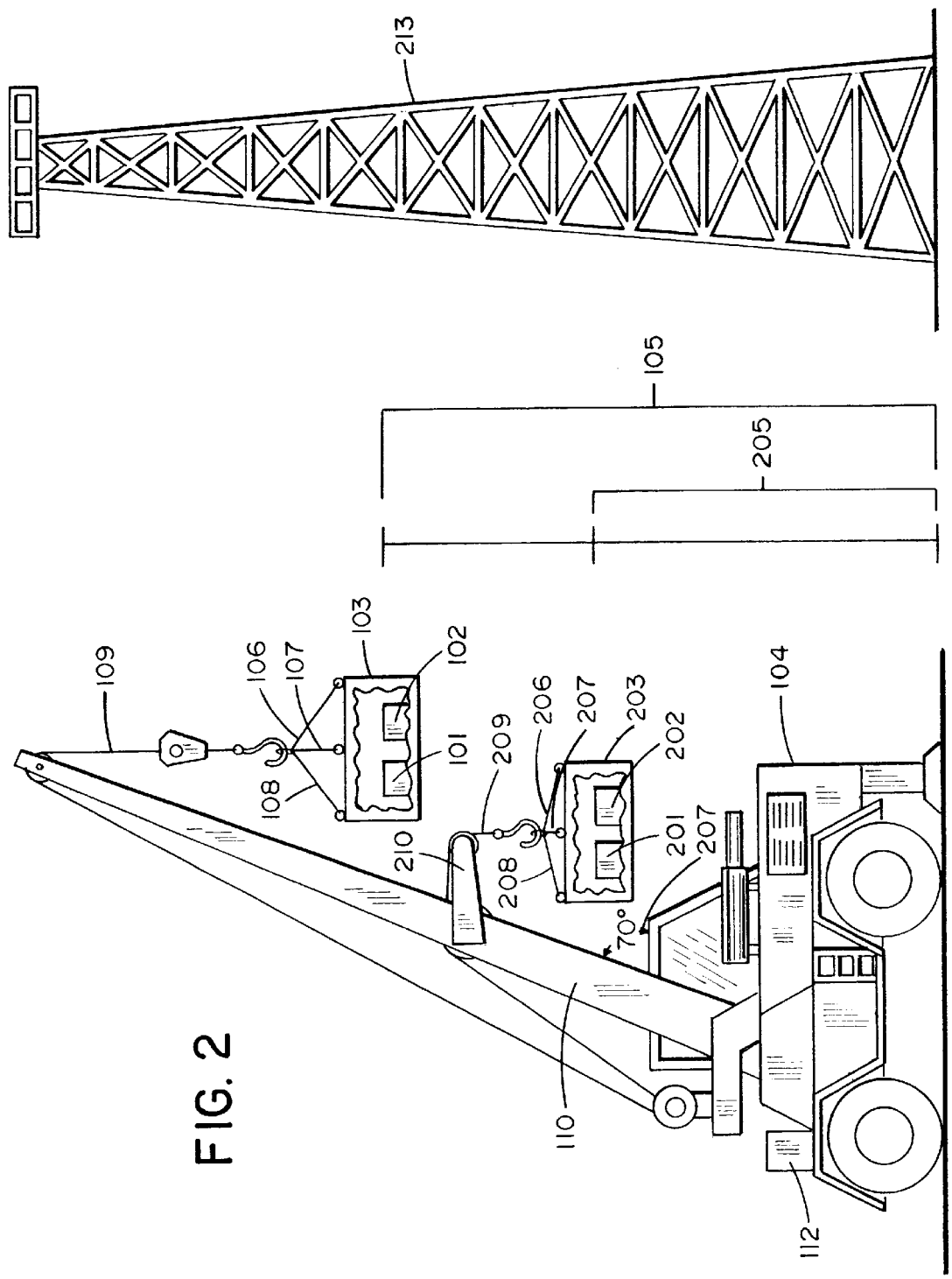
FIG. 2 is a schematic drawing of an embodiment of the present invention that includes and makes use of multiple antennas attached to a crane to simultaneously test field strengths at multiple elevations of a potential site.

FIG. 2 depicts the multiple antenna test system and method that make use of and includes two transmitters 101, 201 and two antennas 102, 202 that are housed in two separate protective carriers 103, 203 and attached to a crane 104 to test field strengths of communication signals at multiple elevations 105, 205 of a potential site. Each protective carrier 103, 203 is supported by cables 106–108, 206–208 that are respectively connected to lead cables 109, 209. Lead cable 109 extends the length of the boom 110 to a hoisting system. Lead cable 209 is supported by a stabilizing system 210 connected at elevation 205 to the boom 110. Further, a generator 112 provides power supply to transmitters 101, 201 and antennas 102, 202. Each of the protective carriers 103, 203 are positioned at a substantially similar elevation 105, 205 near a potential base station site, such as a radio tower 213. The antennas 102, 202 simulate potential wireless communications antenna positioned at corresponding elevations 105 and 205 on the radio tower 113. Each transmitter 101, 201 produces unique propagation test signals that are transmitted by antennas 102, 202. The transmitted propagation test signals are received and measured at various locations within the cell. The angle 207 of the elevating device 104 may also need to be positioned so that each set of propagation signals broadcast by each antenna 102, 202 is independently measurable. In a preferred embodiment, the angle of the boom is 70°. Further, communications network interface equipment may be used to identify the unique propagation test signals transmitted by each antenna 102, 202 and to differentiate the propagated radio field strength associate with each elevation 105, 205.

Figure 3:
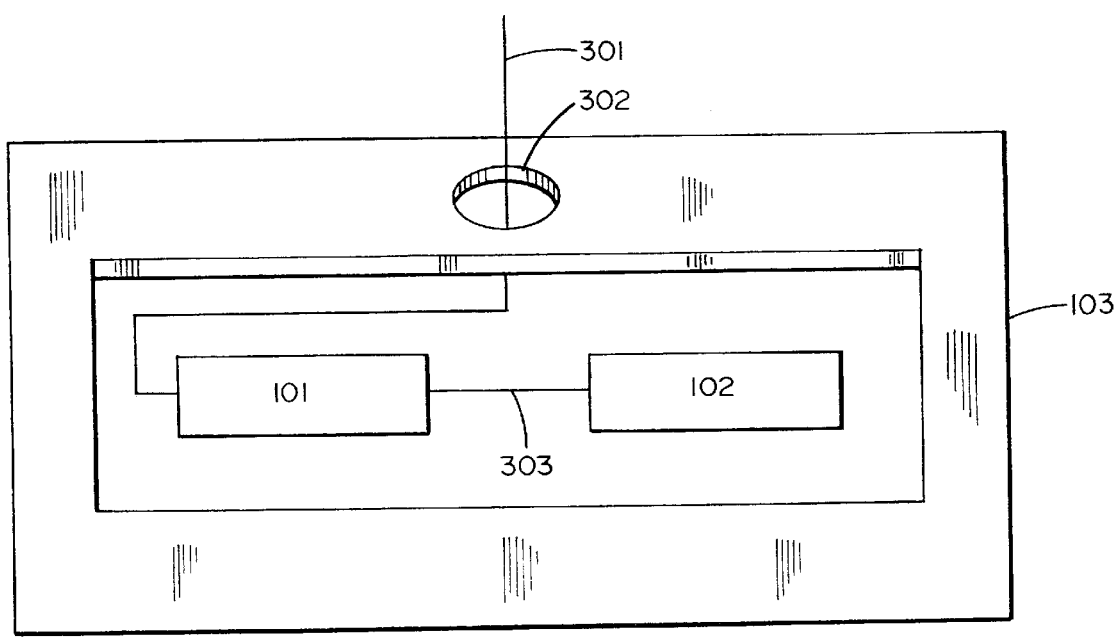
FIG. 3 is a schematic drawing that depicts a protective carrier that securely houses a transmitter and an antenna in an embodiment of the present invention.

As illustrated in FIG. 3, the protective carrier 103 is a hollowed box that contains the transmitter 101 and the antenna 102. The protective carrier 103 is preferably a light-weight, rigid material, such as wood or fiberglass. A separate cable 301 enters an opening 302 in the protective carrier 103 and plugs into the transmitter 101 and antenna 102 to provide power. The transmiter 101 and antenna 102 are secured and safely positioned in the protective carrier 103. The transmitter 101 produces propagation test signals. Alternatively, the transmitter 101 could be positioned on the surface instead of in the protective carrier 103 with the antenna 102.

The transmiter 101 produces propagation test signals. The propagation test signals are transmitted along a cable 303 to the antenna 102. The antenna 102 broadcasts the propagation test signals. The antenna 102 may optionally include a directional or omni-directional antenna element to improve radiation. In a preferred embodiment, the transmitter is an Omni 3dBm gain or an Omni 10dBm gain; however transmitter selection, as well as antenna selection, can vary.

Those skilled in the art recognize that the multiple antenna test system and method are applicable to all wireless communication products, methods, and frequencies. The multiple antenna test system and method, for example, are equally applicable to wireless cellular/PCS phones, wireless computers and modems, wireless personal data assistants, global positioning devices, and any other wireless data/voice communication device. The multiple antenna test system and method are even applicable to satellite phones and satellite communication technology. The multiple antenna test system and method are applicable to code-division multiple access (CDMA) technologies, time-division multiple access (TDMA) technologies, and the global system for mobile communications (GSM) technology. The multiple antenna test system method is also applicable to all frequencies in the electromagnetic spectrum and is compatible with the June, 2000 World Radiocommunication Conference agreement on third generation cellular telephony (806–960 MHz, 1710–1885 MHz, and 2500–2690 MHz). See William Sweet, Cell phones answer Internet's call, *IEEE SPECTRUM*, August. 2000, at 43.

Alternative embodiments of the multiple antenna test system and method could make use of an elevated structure, such as a building or tower, to position and affix the multiple test antennas. Further, various alternate systems and methods exist for attaching the transmitter(s) and antennas to the elevating device or to the elevated structure. For example, each antenna could be affixed and mounted on selected locations of the actual boom of a crane. The boom itself would then be raised and/or lowered to fine tune the elevations of the antennas.

Various embodiments of the invention have been described in fulfillment of the features, aspects, and advantages of the invention. It should be recognized that these embodiments are merely illustrative of this invention. Numerous modifications and adaptations thereof will be readily apparent to those skilled in the art without departing from the spirit and scope of this invention.

What is claimed is:

1. A multiple antenna testing system for simultaneously evaluating field strengths at multiple elevations of a potential site for wireless communications equipment to connect with a communications network, comprising:
    (a) an elevating device capable of being raised;
    (b) a first transmitter capable of producing a first set of test propagation signals;
    (c) a second transmitter capable of producing a second set of test propagation signals;
    (d) a first antenna attached to said elevating device, wherein said first antenna is capable of broadcasting said first set of test propagation signals at a first elevation; and
    (e) a second antenna attached to said elevating device, wherein said second antenna is capable of broadcasting said second set of test propagation signals at a second elevation.

2. The system of claim 1, wherein said elevating device is used to position said first antenna at said first elevation and to position said second antenna at said second elevation.

3. The system of claim 1, wherein said first set of test propagation signals comprise cellular telephone frequencies.

4. The system of claim 3, wherein said cellular telephone frequencies comprise 806–960 MHz.

5. The system of claim 3, wherein said cellular telephone frequencies comprise 1710–1855 MHz.

6. The system of claim 3, wherein said cellular telephone frequencies comprise 2500–2690 MHz.

7. The system of claim 1, wherein said first set of test propagation signals comprise 2.4–2.5 GHz.

8. The system of claim 1, wherein said first set of test propagation signals comprise any frequency signal in the electromagnetic spectrum.

9. The system of claim 1, wherein said second set of test propagation signals comprise cellular telephone frequencies.

10. The system of claim 9, wherein said cellular telephone frequencies comprise 806–960 MHz.

11. The system of claim 9, wherein said cellular telephone frequencies comprise 1710–1855 MHz.

12. The system of claim 9, wherein said cellular telephone frequencies comprise 2500–2690 MHz.

13. The system of claim 1, wherein said second set of test propagation signals comprise 2.4–2.5 GHz.

14. The system of claim 1, wherein said second set of test propagation signals comprise any frequency signal in the electromagnetic spectrum.

15. The system of claim 1, wherein said elevating device comprises a crane.

16. The system of claim 1, wherein said elevating device comprises a cherry picker.

17. The system of claim 1, further comprising a power source capable of providing power to one or more of said first transmitter, to said second transmitter, to said first antenna, and to said second antenna.

18. The system of claim 17, wherein said power source comprises at least one of the following:
    (a) a gasoline-powered generator;
    (b) a solar-powered generator; and
    (c) an electrical-powered generator.

19. The system of claim 1, wherein said first antenna comprises a directional array.

20. The system of claim 1, wherein said first antenna comprises an omni-directional array.

21. The system of claim 1, wherein said second antenna comprises a directional array.

22. The system of claim 1, wherein said second antenna comprises an omni-directional array.

23. The system of claim 1, wherein said communications network comprises a celestial communications network.

24. The system of claim 1, wherein said communications network comprises a terrestrial communications network.

25. The system of claim 1, wherein said first transmitter comprises said first antenna.

26. The system of claim 1, wherein said second transmitter comprises said second antenna.

27. A multiple antenna testing system for simultaneously evaluating field strengths at multiple elevations of a potential site for wireless communications equipment to connect with a communications network, comprising:
    (a) an elevating device capable of being raised;
    (b) a transmitter capable of producing a plurality of test propagation signals;
    (c) a first antenna attached to said elevating device, wherein said first antenna is capable of broadcasting a first set of test propagation signals at a first elevation; and
    (d) a second antenna attached to said elevating device, wherein said second antenna is capable of broadcasting a second set of test propagation signals at a second elevation.

28. A multiple antenna testing system for simultaneously evaluating field strengths at multiple elevations of a potential site for wireless communications equipment to connect with a communications network, comprising:

(a) an elevated structure capable of providing a prop for said wireless communications equipment;

(b) a first transmitter capable of producing a first set of test propagation signals;

(c) a second transmitter capable of producing a second set of test propagation signals;

(d) a first antenna attached to said elevated structure, wherein said first antenna is capable of broadcasting said first set of test propagation signals at a first elevation; and (e) a second antenna attached to said elevated structure, wherein said second antenna is capable of broadcasting said second set of test propagation signals at a second elevation.

29. An apparatus for simultaneously evaluating field strengths at multiple elevations of a potential site for wireless communications equipment to connect with a communications network, comprising:

(a) an elevating device for attaching and positioning test equipment, wherein said test equipment comprises:

(i) a first antenna attached to said elevating device, wherein said first antenna is capable of broadcasting a first set of test propagation signals at a first elevation; and (ii) a second antenna attached to said elevating device, wherein said second antenna is capable of broadcasting a second set of test propagation signals at a second elevation.

(b) a power source capable of providing power to said test equipment;

(c) stabilizing equipment capable of balancing and attaching said test equipment to said elevating device; and (d) communications network interface equipment capable of processing said first set of test propagation signals and said second set of test propagation signal between said test equipment and multiple receiving locations within a potential cell.

30. The apparatus of claim 29, wherein said test equipment further comprises:

(iii) a first transmitter capable of producing and communicating said first set of test propagation signals to said first antenna; and (iv) a second transmitter capable of producing and communicating said second set of test propagation signals to said second antenna.

31. The apparatus of claim 30, wherein said first transmitter comprises said first antenna.

32. The apparatus of claim 30, wherein said second transmitter comprises said second antenna.

33. An apparatus for simultaneously evaluating field strengths at multiple elevations of a potential site for wireless communications equipment to connect with a communications network, comprising:

(a) an elevated structure for attaching and positioning test equipment, wherein said test equipment comprises:

(i) a first antenna attached to said elevated structure, wherein said first antenna is capable of broadcasting a first set of test propagation signals at a first elevation; and (ii) a second antenna attached to said elevated structure, wherein said second antenna is capable of broadcasting a second set of test propagation signals at a second elevation.

(b) a power source capable of providing power to said test equipment;

(c) stabilizing equipment capable of balancing and attaching said test equipment to said elevated structure; and (d) communications network interface equipment capable of processing said first set of test propagation signals and said second set of test propagation signal between said test equipment and multiple receiving locations within a potential cell.

34. The apparatus of claim 33, wherein said test equipment further comprises:

(iii) a first transmitter capable of producing and communicating said first set of test propagation signals to said first antenna; and (iv) a second transmitter capable of producing and communicating said second set of test propagation signals to said second antenna.

35. The apparatus of claim 34, wherein said first transmitter comprises said first antenna.

36. The apparatus of claim 34, wherein said second transmitter comprises said second antenna.

37. A method of simultaneously evaluating propagation field strengths at different elevations for wireless communications equipment to connect with a communications network, comprising:

(a) positioning a first antenna at a substantially similar elevation as a first proposed wireless communications antenna;

(b) positioning a second antenna at a substantially similar elevation as a second proposed wireless communications antenna;

(c) transmitting a first set of wireless communication signals from said first antenna; and (d) transmitting a second set of wireless communication signals from said second antenna.

38. The method of claim 37, wherein said first antenna and said second antenna are attached to an elevating device.

39. The method of claim 37, wherein said first antenna and said second antenna are attached to an elevated structure.

40. The method of claim 37, wherein said first set of wireless communication signals comprise cellular telephone frequencies.

41. The method of claim 37, wherein said second set of wireless communication signals comprise any frequency signal in the electromagnetic spectrum.

42. The method of claim 37, further comprising:

(e) receiving said first set of wireless communication signals at multiple locations within a potential cell; and (f) receiving said second set of wireless communication signals at multiple locations within a potential cell.

43. The method of claim 42, further comprising:

(g) evaluating propagation field strengths at each location where said first set of wireless communication signals are received; and (h) evaluating propagation field strengths at each location where said second set of wireless communication signals are received.

* * * * *